C. ROBERTSON.
WIND SHIELD.
APPLICATION FILED MAR. 22, 1917.
1,285,392.
Patented Nov. 19, 1918.
2 SHEETS—SHEET 2.
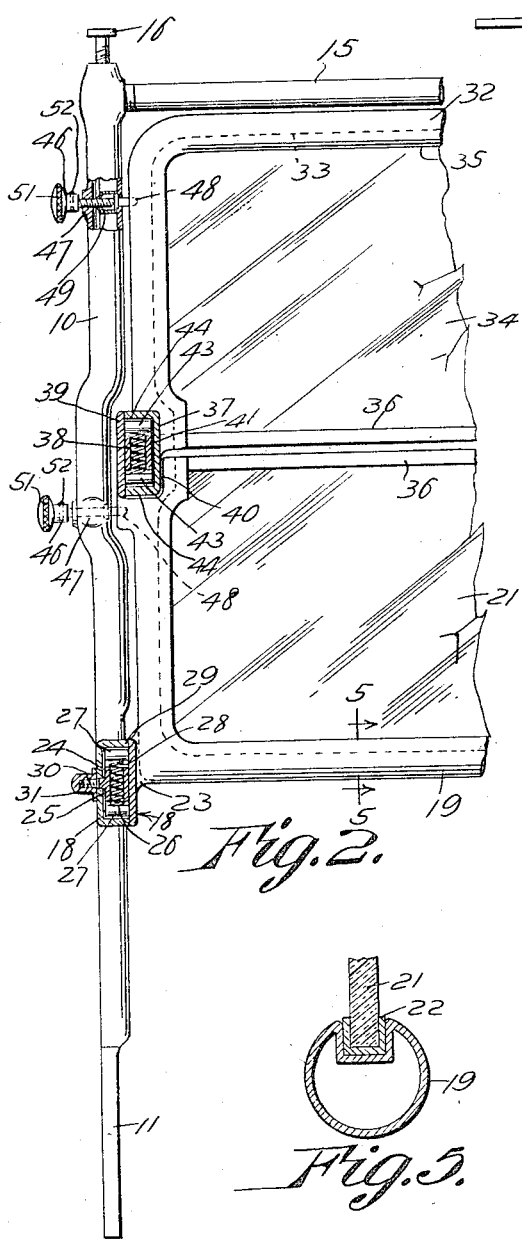
Fig. 2.
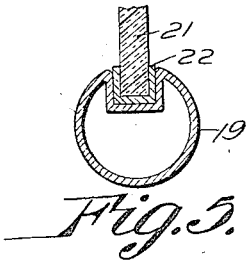
Fig. 5.
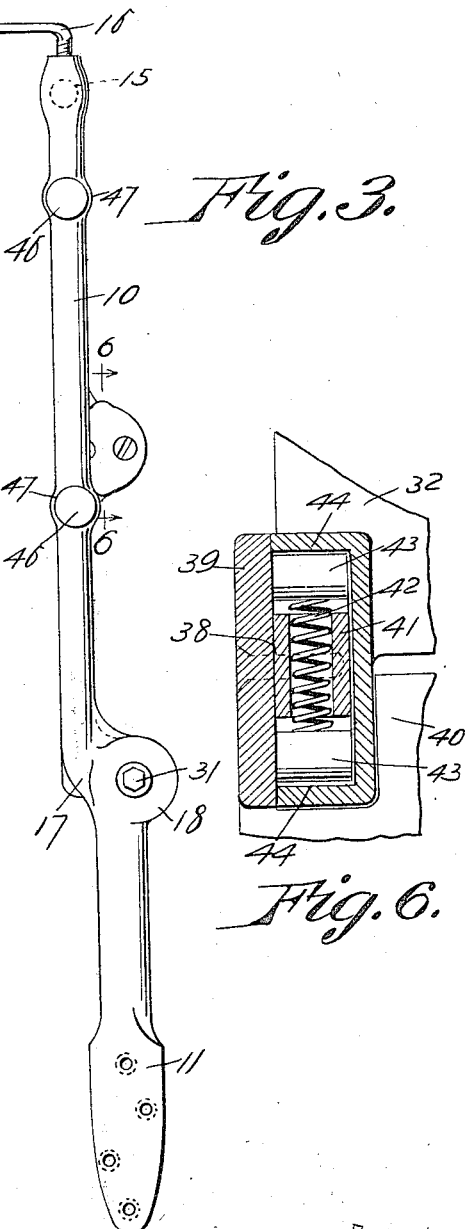
Fig. 3.
Fig. 6.
Inventor
Covert Robertson,
By Talbert + Parker
Attorneys

UNITED STATES PATENT OFFICE.

COVERT ROBERTSON, OF NORTH TONAWANDA, NEW YORK.

WIND-SHIELD.

1,285,392.　　　　　　　Specification of Letters Patent.　　　Patented Nov. 19, 1918.

Application filed March 22, 1917.　Serial No. 156,726.

*To all whom it may concern:*

Be it known that I, COVERT ROBERTSON, a citizen of the United States, residing at North Tonawanda, in the county of Niagara and State of New York, have invented certain useful Improvements in Wind-Shields, of which the following is a specification, reference being had therein to the accompanying drawing.

The invention relates to wind shields, and more particularly to the class of foldable wind shields for motor boats.

The primary object of the invention is the provision of a wind shield of this character wherein the swinging frames carrying the glass panels are joined together for the folding of the same relative to each other into the cockpit of a boat to assure compactness when the shield is lowered so as to be out of the way within said cockpit, the joints being of novel formation to latch the swinging frames when folded or unfolded.

Another object of the invention is the provision of a wind shield of this character wherein the swinging frames can be locked when the shield is raised so as to prevent vibration.

A further object of the invention is the provision of a wind shield of this character wherein one or all of the frames can be detached without detaching the supports or standards therefor of the shield.

A still further object of the invention is the provision of a wind shield of this character which is extremely simple in construction, thoroughly reliable and efficient in its operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawings:

Fig. 2 is an enlarged fragmentary elevation, partly in section, of the wind shield;

Fig. 3 is a side edge elevation;

Fig. 5 is a sectional view on the line 5—5 of Fig. 2.

Fig. 6 is a sectional view on the line 6—6 of Fig. 3.

Similar reference characters indicate corresponding parts throughout the several views of the drawings.

Figure 1:
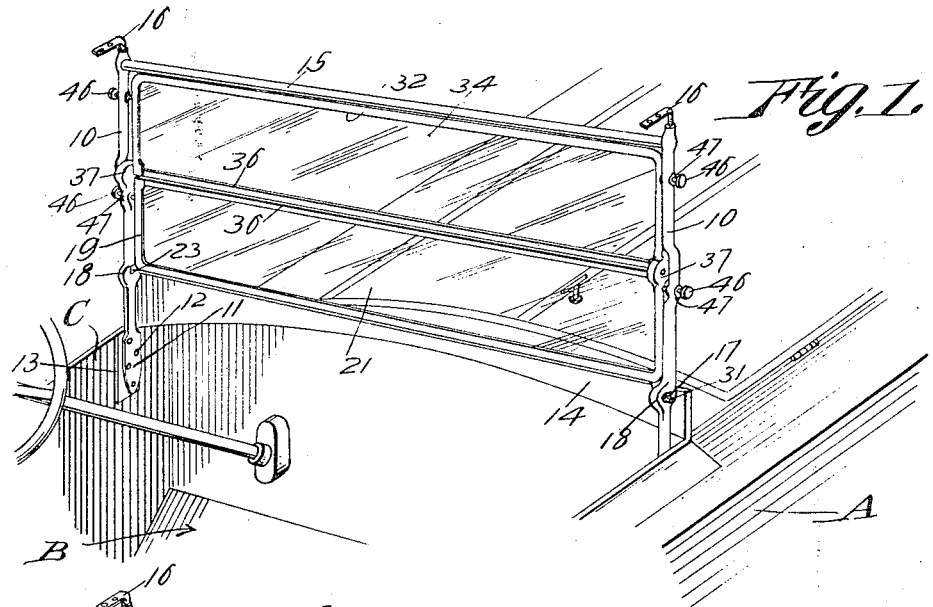
Figure 1 is a fragmentary perspective view of a motor boat with the wind shield constructed in accordance with the invention applied and raised.
Figure 4:
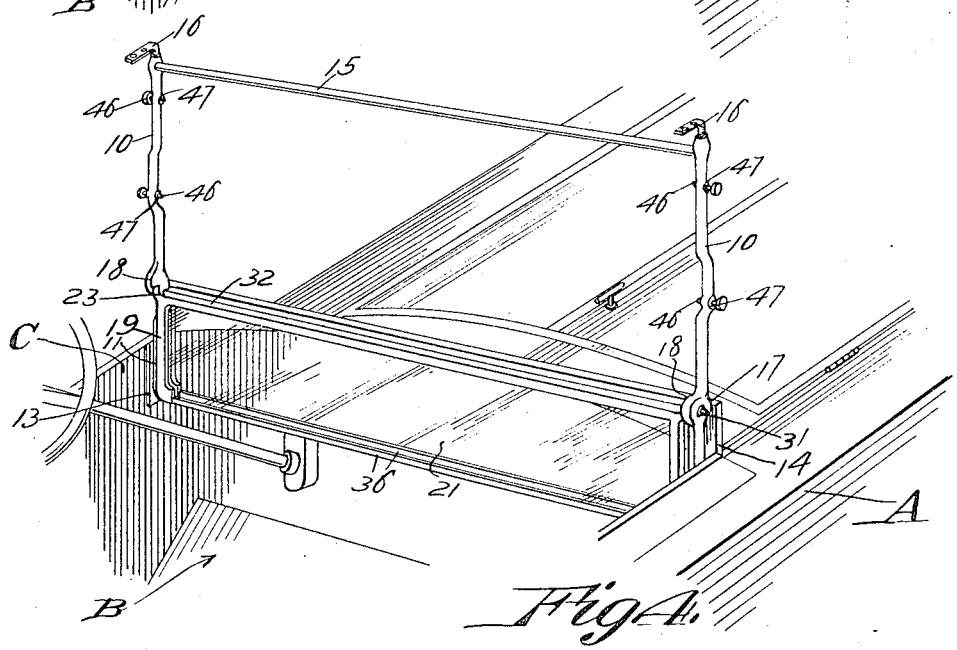
Fig. 4 is a view similar to Fig. 1, showing the shield completely folded.

Referring to the drawings in detail, A designates a portion of the body of a motor boat which is of any approved construction, having therein the cockpit B, as usual, and supported by the body A is the wind shield hereinafter fully described. The wind shield comprises a pair of vertical supports or standards 10 which are formed with flattened lower ends 11 through which are passed screw fasteners 12 which are engaged in bearing plates 13 mounted on the inner faces of the sides of the cockpit coaming C, and in this manner the supports or standards are secured at the proper point of location on the body A of the boat preferably adjacent to the front board 14 of said pit. The upper ends of the supports or standards 10 have threaded therein the ends of a cross rail 15 preferably made from tubular material, and this rail constitutes a tight connection between the supports or standards to assure rigidity thereto.

Mounted in the upper ends of the supports or standards 10 by threaded engagement therein are substantially L-shaped clamps 16 which are adapted to engage with the front end of a canopy or folding top for the cockpit of the motor boat, these clamps being no part of the present invention and merely serve to fasten the front end of the folding top when resting upon the cross rail 15 of the shield.

The supports or standards 10 each is formed with an elbow 17 which offsets forwardly the major or upper portion of said support or standard immediately above the upper edge of the front board 14 of the cockpit, and at the point of the elbow is provided a cylindrical barrel 18 for swingingly mounting the lower glass-carrying section of the wind shield hereinafter fully described. The lower carrying section of the wind shield comprises a U-shaped frame 19 which is formed with an inner channel constituting a seat for the glass panel 21 carried thereby, the channel being fitted with a resilient binding 22 serving as a cushion for the glass panel 21 engaged in said seat and carried by the frame. At the corners of the closed end of the frame 19 are formed ears 23 to each of which is bolted or otherwise fastened a circular joint stud or disk 24 adapted to rotatably fit within the barrel 18, and is provided with a transverse bore 25 centrally thereof, in which is fitted a coiled expansion spring 26, the ends of which act against latch rollers 27 occupying notches 28 in the stud or disk 24 at diametrically opposite points and also are adapted to become seated under the action of the spring 26 in counterseats 29 formed in the inner wall of the barrel 18 at diametrically opposite points thereof, and in this manner the frame 19 can be latched in raised or lowered position when the same is swung from lowered to raised position or vice versa. The stud or disk is formed with an externally threaded lug 30 centrally thereof, which protrudes through a suitable opening centrally in the closed outer side of the barrel 18 and has engaged thereon a cap nut 31 so that in this manner the frame 19 is pivotally secured to the supports or standards 10, as will be obvious.

Mounted upon the lower glass-carrying section is the upper glass-carrying section which comprises an inverted U-shaped frame 32 which is formed with an inner channel 33 constituting a seat for the glass panel 34 carried thereby, the seat 33 being fitted with a resilient binding 35 constituting a cushion for the glass panel 34 when mounted in the frame. It is of course understood that the frames 19 and 32 are constructed substantially identically with each other and the glass panels are held therein through the medium of a retaining strip 36 detachably secured at the open ends of said frames, as will be obvious.

On the extremities of the upper frame 32 is formed an offset cylindrical barrel 37 in which is received the joint stud or disk 38 detachably fastened to the lower frame 19. It is understood, of course, that two barrels 37 are formed on the upper frame and the studs or disks 38 received thereby are detachably bolted or otherwise secured to circular ears 39 formed on the outer arms 39′ which latter are in turn provided when the upper ends of the lower frame are bifurcated as at 40 and these ears also accommodate the adjacent barrels 37, the studs or disks each being provided with a transverse bore 41 centrally thereof in which is located a coiled expansion spring 42 which has its ends working against latch rollers 43 held within notches 44 constituting seats therefor at diametrically opposite points in the periphery of the stud or disk 38, and these rollers 43, under the action of the springs, are adapted to engage in seats 45 formed in the inner surface or wall of the barrel 37 at diametrically opposite points so that on the swinging of the upper frame 32 relative to the lower frame 19 in raised or lowered position or vice versa said frame will be latched in its adjusted position.

Threaded in the supports or standards 10 are locking screws 46, each being formed with a lug 47 at its inner end adapted to engage in a socket 48 formed in each frame of the wind shield, the lug end 47 of the screw 46 being formed with a stop shoulder 49 which works within a pocket in the support or standard 10, and this shoulder limits the movement of the screw 46 to prevent the working of the same from the standard or support, while the outer end of the screw is formed with a detachable knurled head 51 which is keyed at 52 thereto, it being understood that the head is removed when the screw 46 is placed within the support or standard 10 from the inner side thereof for the mounting of the screw therein. These screws 46 will lock the lower and upper frames 19 and 32 in raised position and will prevent vibration thereof when the motor boat is in action.

The elbows or offsets 17 of the supports or standards 10 permit compact folding of the upper and lower frames and the positioning thereof relative to the dash or front board 14 of the cockpit B in the body A of the boat.

It will be obvious that the upper frame 19 can be folded inwardly and downwardly in substantial parallelism with the lower frame 32 and also that said lower frame can be folded inwardly and downwardly within the cockpit B so that the wind shield will be out of the way when not in use. The upper frame 19 will lie between the dash or front board 14 of the cockpit and the lower frame 32 when both of the frames have been folded or brought to lowered position. The manner of raising either one or both of the frames will be clearly obvious.

From the foregoing description, taken in connection with the accompanying drawings, the construction and manner of use of the herein described wind shield will be readily apparent and, therefore, a more extended explanation has been omitted.

Having thus described my invention, I claim:

A wind shield of the character described including a pair of standards, a pair of U-shaped glass carrying frames, barrels offset from the sides of the upper frame near the bottom thereof and formed with opposed notches the upper ends of the sides of the lower frame being bifurcated to provide spaced arms, ears formed with the outer arms, disks carried by the arms and having transverse bores, coil springs disposed in the bores and having their respective ends bearing against the rollers to hold the rollers in the notches to consequently maintain the frames in an extended position, means for pivotally connecting the lower frame to the standards near the lower ends thereof and means mounted in the standards for locking both of the frames in an extended or raised position.

In testimony whereof I affix my signature.

COVERT ROBERTSON.

Witnesses:
J. E. ROBERTSON,
CHAS. S. ORTON.

Copies of this patent may be obtained for five cents each, by addressing the "Commissioner of Patents Washington, D. C."